Sept. 28, 1971 — A. M. COOK — 3,608,134
MOLDING APPARATUS FOR ORIENTING ELONGATED PARTICLES
Filed Feb. 10, 1969 — 2 Sheets-Sheet 1

INVENTOR
ARNOLD M. COOK
BY Walter Fred
AGENT

INVENTOR
ARNOLD M. COOK
BY
*Walter Fred*
AGENT

United States Patent Office 3,608,134
Patented Sept. 28, 1971

3,608,134
MOLDING APPARATUS FOR ORIENTING ELONGATED PARTICLES
Arnold M. Cook, Holden, Mass., assignor to Norton Company, Worcester, Mass.
Filed Feb. 10, 1969, Ser. No. 798,002
Int. Cl. B29c 1/00
U.S. Cl. 18—5M 11 Claims

ABSTRACT OF THE DISCLOSURE

A mixture of bond material and elongated abrasive particles and/or reinforcing fibers is placed in a rotatable mold and the mixture is leveled and combed with radially extending combs of uniformly spaced horizontally and vertically extending elements. The combing elements are effective to contact and position the particles and/or fibers in the uncured mix with their long axes parallel and extending radially, circumferentially of, or perpendicular to a given axis so that when the mix is fired or the bond is otherwise activated, the elongated elements will be selectively positioned with respect to a working surface of the completed abrasive tool.

BACKGROUND OF THE INVENTION

The field of the invention is abrasive tool making, including processes for orienting grains and reenforcing fibers in bonded abrasive tools.

In the manufacture of certain types of bonded abrasive products elongated abrasive particles may be used alone or they may be mixed with other particles having a blocky shape. The molding process heretofore utilized has resulted in a heterogeneous arrangement of the individual particles of the bonded abrasive product and provided a random disposition of the cutting edges at the working or grinding surface of the completed tool.

In the coated abrasive field it has long been the practice to use abrasive grains having an elongated shape and these grains are oriented usually by the electrostatic process, when they are applied to the backing materials. This is done in order to present the sharpest cutting edges to the work, and also to provide a better holding power for each particle. But in the case of the abrasive particles in the coated abrasive field they are not completely surrounded by bond material as is true in a grinding wheel for example, and the electrostatic process cannot be used for orienting the elongated grain in the conventional wheel making process.

Elongated abrasive grains suitable for orientation in an abrasive tool are disclosed in U.S. Pats. 3,183,071 of Rue et al., 2,033,991 to Melton et al. and 2,150,034 to Melton et al. which also disclose a combined electrostatic, magnetic and jolting method for orienting abrasive grains. The U.S. patent of Benner et al. No. 2,035,521 dated Mar. 31, 1936 discloses the orientation of grains being applied to an adhesive coated web by the simple device of orienting them in parallel channels and discharging the oriented grains onto the web.

Also disclosed in the prior art is the reinforcing of abrasive tools with randomly dispersed elongated fibers mixed with abrasive particles and bond. The prior art fibers, however, have never been strategically arranged in a particular pattern or concentrated in any particular area where they would most effectively resist the centrifugal force as the speed of rotation increases to make the abrasive wheels operate more efficiently. The strategic placement of fibers for optimum strength is important and further minimizes the volume of fibers required to accomplish a given gain in safety. It is preferred to orient the long axes of the fibers in line with the stresses depending upon the design of the tool, and in a wheel, to contain the forces in a circumferential pattern.

Pat. 2,226,006 to Hart discloses mixing short metal fragments thoroughly with the mix without regard to regularity of position or direction. Pat. 2,275,339 to Allison teaches the uniform distribution of metal fibers such as metal wool in an abrasive product which serve to conduct heat away from the grinding surface to the side surfaces of the wheel where it is dissipated to the coolant. Pat. 2,972,527 to Upton discloses reinforcing resilient foam abrasive structures with randomly distributed vegetable and synthetic fibers, as well as with inorganic fibers dispersed in the mixture.

SUMMARY OF THE INVENTION

According to the present invention, a grinding wheel is produced having elongated abrasive grains and/or reinforcing fibers oriented with their long axes extending in a radial direction towards and substantially perpendicular to the peripheral grinding surface of the wheel. Another embodiment produces a grinding wheel wherein the elongated reinforcing fibers are oriented with their long axes extending substantially concentrically with respect to the peripheral grinding surface of the wheel. Still another embodiment is a combination of the above embodiments wherein reinforcing fibers are oriented with their long axes extending concentrically around an inner central annular area of the wheel and the elongated abrasive grains oriented with the long axes extending radially in an outer annular area of the same wheel.

In further embodiments of radial face grinding wheels the abrasive grain may be disposed therein with the long axes of the particles extending either vertically with respect to a line tangent to the face, or parellel to the axis about which the wheel rotates.

To carry out my invention, a mixture of bond and abrasive grits including grits of the desired type of elongated particles, reinforcing fibers and bond material, is deposited in a layer within the cavity of a rotating mold. A relatively stationary comb of the desired radial length comprising vertically spaced thin parallel teeth or elements are disposed to pass horizontally through the entire depth of all of any selected annular portion of the moving mixture. The thin teeth or elements contact the misaligned and moving elongated particles carried in the mix and orient them with their long axes positioned substantially parallel to one another. Then a second comb of predetermined radial length comprising radially spaced vertically extending thin parallel elements, is selectively reciprocated radially or fixed to pass through the layer of moving mix. Reciprocating the elements further orients the long axes of the previously arranged parallel particles, to align their axes in a radial direction and substantially perpendicular to the working surface. Where fixed elements are used the long parallel axes of the particles are then further oriented to be disposed substantially circumferentially within the working surface of the grinding wheel.

In another modification the comb element reciprocates vertically spaced short horizontally extending elements vertically through the layer of the rotating mix to orient the long axes of the particles perpendicular to the radial working face of the wheel. Alternatively, the grinding wheel may comprise two or more dissimilar annular portions formed from mixtures with reinforcing fibers in one area and abrasive grains in another. Each area may be combed individually to orient the grains and fibers in the respective areas in a desired manner.

Upon orientation of the elongated particles and removal of the comb elements, the mixture is further conventionally formed as by pressing and/or curing the bond to solidify the mixture into a bonded abrasive article.

Having in mind that elongated particles have not been satisfactorily oriented in certain abrasive product mixtures, it is an object of the present invention to apply an improved method to accomplish the desired orientation of elongated abrasive grains and reinforcing fibers homogeneously throughout the internal mass of the body of a bonded abrasive product.

It is a particular object of the present invention to provide apparatus for mechanically contacting and orienting elongated particles in the mass of an abrasive mixture used for making a bonded abrasive product.

Another object of the present invention is to provide an economical method of producing a grinding wheel having the best cutting edges of the abrasive particles available to grind the work to which the wheel is applied and for disposing reinforcing fibers strategically in the body of the wheel to increase its strength.

Upon further study of the specification, drawings and claims, other objects and advantages of the invention will become apparent.

DESCRIPTION OF THE PREFERRED EMBODIMENTS

Figures 1, 2, 2A:
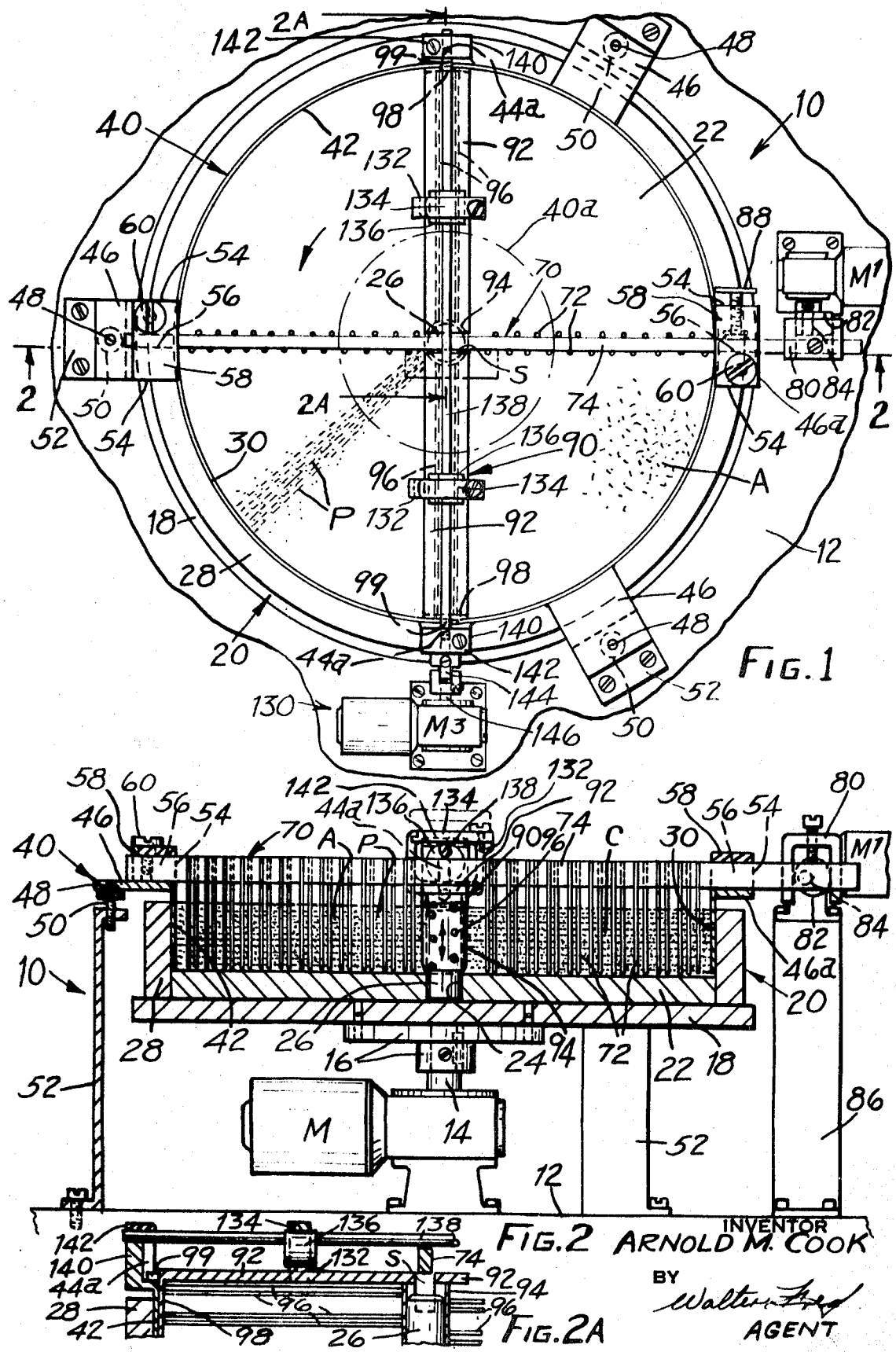
FIG. 1 is a plan view of the preferred apparatus for orientation of elongated particles.
FIG. 2 is a cross sectional view in elevation taken approximately on line 2—2 of FIG. 1.
FIG. 2A is a partial cross sectional view in elevation taken approximately on line 2A—2A of FIG. 1.

In FIGS. 1 and 2 is shown a mechanical apparatus 10 for orienting elongated particles. The apparatus comprises a rotatable mold for receiving the mixture containing elongated particles that are to be oriented, the mold being rotatably driven by a variable speed reduction drive motor M, FIG. 2, fixed on a base or support means 12. Extending upwardly from the motor M is a rotatable output drive shaft 14 to which is keyed an adjustably fixed flat annular turntable or flange 16. The table 16 supports a mold support member or base plate 18 which is centered on, keyed to and rotatably driven by the table.

A mold 20 is centered on and driven by the plate 18 and comprises a bottom mold plate 22 having a central hole 24, in which is situated a central pin or arbor 26. Encircling the mold plate 22 is a cylindrical mold band 28 having an inner sidewall 30 of predetermined height which surrounds the annular cavity containing a loose bondable abrasive mixture A with elongated particles P to be oriented therein.

Extending into the annular cavity c adjacent the sidewall 30 is a stationary removable and vertically adjustable comb support means 40. The comb support means comprises a thin walled cylinder 42 extending substantially perpendicular to and close to the mold plate 22 and concentric with the sidewall 30.

Spaced about and fixed to the top outer peripheral portion of the cylinder 42 are cylinder locating and retainer plates 46 which extend radially outwardly in substantially the same horizontal plane above and beyond the outer periphery of mold 20. Each of the plates 46 has a locating hole 48 into which protrudes one end of vertically adjustable locating pin 50 threaded into a vertical support bracket 52 extending downwardly below each of the locating plates 46 to the base 12 to which they are fixed.

A guid plate 46a is also fixed to the wall of cylinder 42 diametrically opposite one of plates 46 and both of the plates 46 and 46a have spaced parallel upright members 54 fixed thereto as by welding. The spaced members 54 form opposed aligned guideways 56 in which is located the opposite end portions of a reciprocable grid or comb 70, which is held in the guideway by retainer cap 58 and screws 60.

The comb 70 includes a plurality of horizontally spaced but vertically extending elements 72 that reach into the cavity c. The elements 72 are fixed, as by welding, in a staggered relationship to the opposite sides of a support bar 74 that forms the back of the comb and extends diametrically across the mold from plate 46 to pass through to the opposite guideway 56 on the plate 46a. One end of bar 74 extends past plate 46a and is provided with an inverted U-shaped cam follower 80 that may be adjustably fastened to bar 74, the follower being engaged and reciprocated by an eccentric cam 82 fixed to the rotatable drive shaft 84 of a second variable speed reduction drive motor M1. The motor M1 is supported on a pedestal 86 fixed to the base 12.

It can be seen that the comb 70 is held against rotation and may be adjusted vertically by manipulating the adjusting screws 50. Also, the comb 70 can be readily removed, by merely pivoting the retainer caps 58 clear of the guideways and lifting bar 74 out of the guideways and cam follower 80 off the cam 82.

The comb 70 can either be reciprocated at various speeds and distances by controlling the speed of motor M1 and interchanging cams 82 or it can be held stationary by a clamp screw 88 in one of the members 54. The movement of or stationary position of the comb is selected for orienting elongated particles of various lengths in different directions as will appear more fully below.

A removable comb 90 having horizontally disposed elements 96 is situated in the cavity c to be disposed at about 90° from the position of comb 70. Comb 90 extends diametrically across the mold 20. The comb 90 is formed in two parts including two flat tie bars 92 which extend horizontally from diametrically opposite surface portions of the wall of cylinder 42. The inner ends of the tie bars terminate at the support bar 74 of comb 70 near the axis of the rotation of the mold.

A cylindrical sleeve 94 having a central slot is fixed as by welding to the ends of the tie bars 92 below the bar 74 and extends downwardly into the cavity c over the central arbor 26 substantially to the mold plate 22. Extending horizontally from diametrically opposite peripheral portions of the sleeve 94 are vertically spaced rows of a plurality of thin parallel combing elements 96, which are arranged in staggered relationship. One end of each of the particle contacting or combing elements 96 is fixed, as by welding, to the sleeve 94 and the opposite ends respectively to end brackets 98 fixed at the outer ends of the tie bars 92 which brackets extend downwardly into the cavity adjacent the cylinder 42. Projecting from brackets 98 are pins 99 which extend into vertical slots 44a in the wall of cylinder 42 and blocks 140 fixed thereto having pivotable retainer caps 142 whereby the comb 90 is prevented from rotating, reciprocable, if desired, easily removed and replaced with a similar interchangeable comb of different spacings and also adjusted vertically with the cylinder 42 and grid 70 by manipulating the adjusting pins 50.

Figure 5:
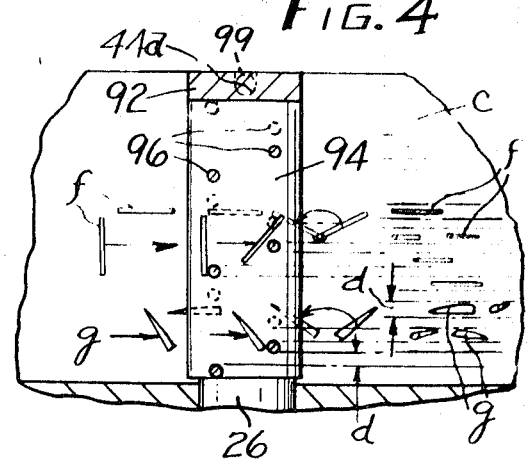
FIG. 5 is a schematic vertical section showing how elongated particles are oriented in planes parallel to the side faces of a wheel for example, prior to being oriented circumferentially or radially.

In FIG. 5 there is shown a fragmentary schematic view of the arrangement and spacing of the combing elements 96 which illustrates how elongated particles such as the several individual reinforcing fibers f, as well as elongated abrasive grain g is each one oriented in the rotating mix as the elongtaed particles each successively engages the elements the relative motions serving to align the long axes of the several particles into substantially horizontal and parallel planes. As the mold and mixture are continuously rotated the elements 96 in effect inscribe therein a plurality of equally spaced paths that are disposed at different elevations as shown in phantom lines. Because the elements 96 are angularly spaced in a helical path around the sleeve 94, the elongated fibers or the abrasive grains g starting from their initial positions in the mix as shown on the left side of FIG. 5 will be progressively turned or moved by contact with elements 96 and eventually are made to occupy a position between the paths of the elements. To prevent bridging by the particles between two adjacent elements 96, the distance between the elements in all directions and of adjacent rows is selected to be greater than the length of the particles to be oriented. Also the vertical spacing d between the elements 96 and the paths inscribed by them is substantially uniform and greater than the thickest particle to be encountered. Obviously elongated particles will initially be randomly oriented in all directions within the mixture and some of them may be properly oriented after one or two contacts with the elements while others will require more contacts.

Figure 3:
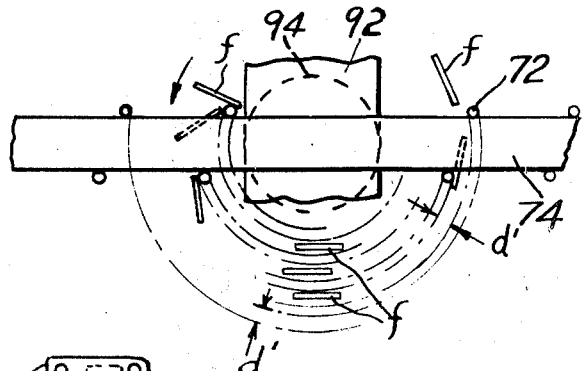
FIG. 3 is a schematic plan view showing how elongated particles are oriented circumferentially.
Figure 4:
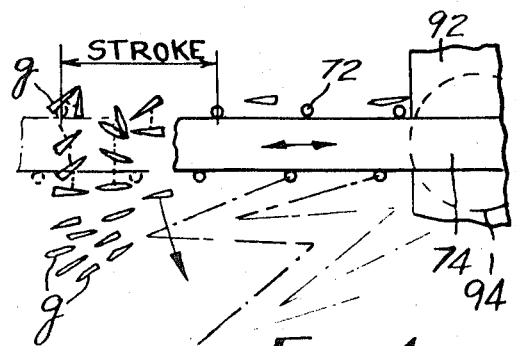
FIG. 4 is a schematic plan view showing how elongated particles are oriented radially.
Figure 9:
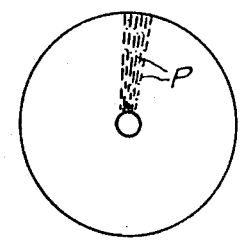
FIG. 9 is a view of a grinding wheel having radially oriented elongated particles.
Figure 10:
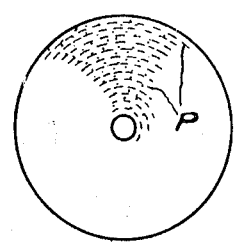
FIG. 10 is a view of a grinding wheel having circumferentially oriented elongated particles.

Once the elongated particles have been oriented in horizontal parallel planes by the comb 90 they are then oriented with their long axes either extending radially as shown in FIGS. 4 and 9 or circumferentially as disclosed in FIGS. 3 and 10. Circumferential orientation is accomplished by rotating the mixture past the fixed comb 70. FIG. 3 shows the system for engaging the previously horizontally oriented fiber f of FIG. 5, to progressively orient it into a circumferential pattern by contact with the vertically disposed elements 72. The distances between elements 72 in each row and adjacent rows are greater than the length of the particles encountered to prevent bridging. The elements are staggered as explained above and each one is situated at a different radial distance from the axis of rotation of the mold 20. However, the radial distance d' between each of the elements 72 and thus the paths inscribed by them as shown in phantom lines, is substantially uniform, and greater than the thickness of any of the particles.

When the particle f in its initial position as shown at the left side of FIG. 3, is rotated with the mixture, the fiber or particle is first contacted and moved by an element 72 after which, if it is not properly oriented, it contacts another element 72 and so on until all of the particles are properly oriented between the respective paths of the elements 72 produced by rotating the mix past the elements.

FIG. 4 depicts means for effecting radial orientation of the long axes of elongated particles, as for example, the abrasive grains g shown in FIG. 5. In this apparatus the comb 70 is reciprocated in the directions indicated by the arrow, while the mixture is simultaneously rotated slowly. The grid 70 is reciprocated relatively quickly in a radial direction and for a distance greater than and preferably 2 to 8 times the length of the particles, and about twice the distance between the vertical elements 72. The relative movement of elements 72 and the mix, inscribe overlapping circular substantially sinuous paths through the rotating layer of mixture as indicated by the broken lines in FIG. 4. As the elements 72 begin a stroke in one direction the non-radially oriented particles are contacted at one end and are either partially turned or fully turned into a radial direction. At the end of the stroke some of the particles will have been rotated sufficiently while others that have not been properly oriented will be contacted upon the return stroke of one of the same elements 72 or one of those elements 72 of the remaining rows. Since the elements 72 are located at different radial distances from the axis of rotation, and are reciprocated radially as well, all of the elongated particles will eventually be oriented in substantially a radial direction and substantially perpendicularly with respect to the periphery of a cylindrical abrasive tool.

It is immaterial whether the horizontal and radial orientation is done separately or simultaneously as the elongated particles will initially be turned to a horizontal plane and then will be oriented radially. However, the elongated particles which are initially inclined in an angular position between true vertical and horizontal planes may be first contacted by elements of either the radial or horizontal orienting grids and then finally oriented with their long axes substantially parallel to one another and extending substantially radially and perpendicular to the cutting or working surface of the prospective abrasive product.

Although one reciprocating row of thin elements 72 would suffice, the use of more rows will speed up the action. The path described by the reciprocating elements will depart from the true radius because of the simultaneous rotation of the mold and there will be greater relative movement between the mix and elements 72 near the periphery of the mold. The degree of inclination from a true radius is directly related to the reciprocation and rotational speeds. Therefore, there may be a small but acceptable departure or angle of inclination from the true radial orientation of some of the particles, but this will not noticeably affect the attributes of the grinding action of the finished product. In order to keep the angle of inclination within acceptable tolerances, the reciprocations per revolution of the mold may be calculated by the formula:

$$\text{strokes per rev.} = \frac{\pi d}{(\text{length of stroke}) \ (2) \ (\tan \theta)}$$

where $d$ = diameter of wheel being made
$\theta$ = acceptable tolerance of angle of inclination.

For example, with a 10° angle of inclination tolerance, a 12″ diameter mold cavity and a ½″ stroke, $$\text{strokes per rev.} = \frac{\pi \times 12}{.5 \times 2 \times .1763} = 214$$

It is also desirable to establish a speed of reciprocation which is as fast as possible. A speed of 400 strokes per minute for a length equal to twice the distance between elements 72 is reasonable. In the above example the rotational speed of the mold should be about 2 revolutions per minute with a reciprocation of elements 72 of 400 ½″ strokes per minute.

Figure 13:
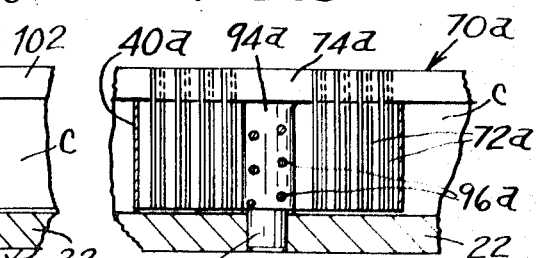
FIG. 13 is a partial view in elevation of a modified grid for effecting the orientation of elongated particles in different annular zones of the mixture in different directions as shown in FIGS. 8 and 11.
Figure 8:
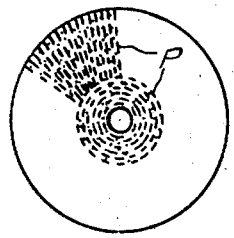
FIG. 8 is a view of a grinding wheel having an annular portion of radially oriented elongated particles and an inner annular portion of circumferentially oriented elongated particles.
Figure 11:
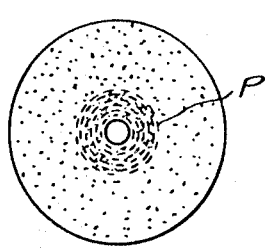
FIG. 11 is a view of a grinding wheel having an inner annular portion with circumferentially oriented elongated particles and an outer annular portion of either randomly oriented particles or elongated particles oriented vertically, parallel to the axis, and perpendicular to the sides thereof.

Variations in the pattern of orientation of the elongated particles may be accomplished as shown in FIGS. 8, 9, 10, 11 and 12 by a slight change in the arrangement of the combing elements. For example, if the annular portion of the abrasive wheel near the center is not used for grinding and engaged only by clamping drive means, the radial orientation of the particles in this area is not necessary. This is the area in such a wheel where the greatest tangential stress occurs due to centrifugal forces and, therefore, it is desirable to orient the long axis of the elongated particles circumferentially for increased strength in the central area as shown in FIGS. 8 and 11. In order to accomplish this an inner combing means or apparatus is shown in FIG. 13 and includes a short comb 70a interchangeable with the comb 70 comprising thin parallel vertical elements 72a fixed to a bar 74a in the central annular area only. Situated in the mixture and fixed to bar 74a is a separation ring or cylinder 40a that surrounds elements 72a. A series of thin short horizontal combing elements 96a extend from cylindrical wall 40a to a central bushing or sleeve 94a fixed to the bar 74a and centered on the arbor 26. The separation cylinder 40a divides the inner annular portion of the mixture from the outer annular portion.

The apparatus of FIG. 13 is used to produce the abrasive wheel of FIG. 8, the combs 70 and 90 described in FIGS. 1 and 2 are first used and are then removed from the mold cavity after all the particles have been oriented radially. Then the comb 70a is inserted in the mold in place of the comb 70 and the mold and mixture is rotated whereby only the elongated particles in the inner area contained within cylinder 40a are reoriented in a circumferential pattern by the relatively stationary elements 72a and 96a.

The elongated particles within the inner annular portion of the wheel can be either abrasive grain $g$ or reinforcing fibers $f$. Alternatively elongated particles may be left out of the inner circular portion of the mixture. However, it is preferable to use reinforcing fibers in the inner annular portion and therefore the mixture would be different from that in the outer annular portion. The reinforcing fibers may be added separately to the mix placed within the central cylinder 40a.

Figure 7:
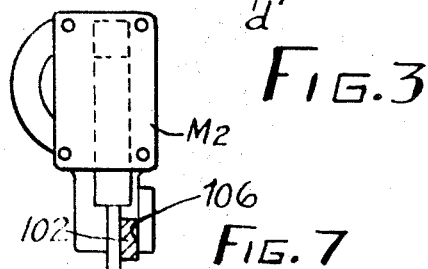
FIG. 7 is a partial vertical section taken approximately on line 7—7 of FIG. 6.
Figure 6:
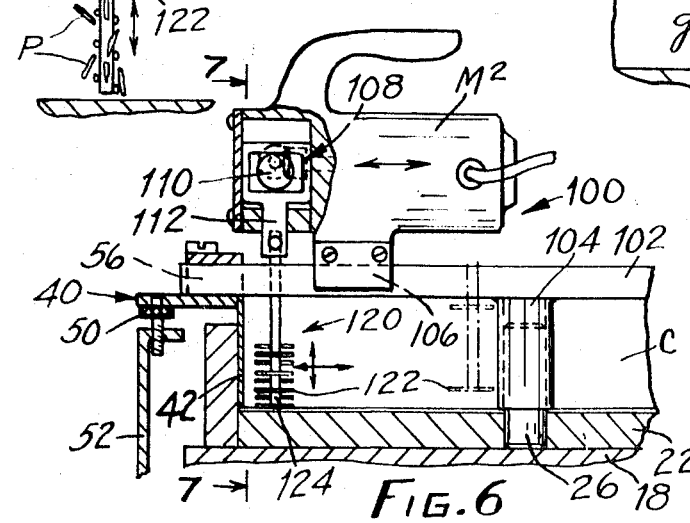
FIG. 6 is partial sectional view of a modification of the apparatus of FIGS. 1 and 2 showing means for orienting elongated particles vertically.
Figure 12:
FIG. 12 is a view of a radial face grinding wheel having vertically oriented elongated particles extending perpendicular to the side faces thereof.

Another example is shown in FIG. 11 wherein the inner annular portion may include circumferentially oriented elongated particles and the outer annular portion either randomly oriented abrasive particles or particles oriented to be parallel to the axis of wheel rotation as shown in FIG. 12. A means to accomplish grain orientation in accordance with this pattern is shown in FIGS. 6 and 7 wherein a vertical reciprocable combing means or apparatus 100 is utilized. The vertical reciprocable combing means 100 comprises a stationary horizontal guide bar 102 extending diametrically across the mold 20, being supported in the guideways 56. The bar is centralized by a bushing or sleeve 104 fixed to the guide bar 102 and extends over the arbor 26. Any conventional variable speed reduction type motor $M^2$ used to drive vertical reciprocating sabre saws, is slidably mounted on the guide bar 102 by means of a guideway 106 fixed to the motor housing. The motor $M^2$ drives reduction gearing 108 which rotates an eccentric cam 110 to reciprocate tool holder 112 vertically. Removably fixed to the tool holder 112, by a set screw, is a vertically reciprocable comb 120 having short horizontally disposed thin combining elements 122 fixed in vertically spaced parallel relation to a bar 124 in the manner taught above in regard to the horizontally reciprocable grid 70. The comb 120 is mounted in the holder 112 with elements 122 disposed horizontally.

The apparatus can be operated and modified in various ways to attain the same relative speeds as taught above in radial orientation of the particles. The cam 110 may be interchanged with another to vary the stroke and other vertical reciprocable combs 120 with different spacings between the elements 122 may be substituted therefor. By traversing the motor $M^2$ and the grid 120 radially between the wall 44 and the bushing 104 while the mold is rotating, substantially all of the elongated particles in the mixture will be oriented with their long axes vertical and substantially perpendicular to the working face of the wheel as shown in FIGS. 11 and 12. To produce the wheel of FIG. 11 with the circumferentially oriented particles in the inner zone, comb 70a with separation cylinder 40a is inserted into the mold cavity as explained above.

Alternative means may be provided for reciprocating the horizontal comb 90 in a vertical direction so that the elongated particles may be oriented as shown in FIGS. 11 and 12. The alternative reciprocating means 130 shown in FIGS. 1 and 2 comprises a pair of cam followers 132 each having a cap 134 pivotally fixed thereto. A pair of eccentric cams 136 engage the cam followers 132 and are fixed to a rotatable shaft 138 journalled in blocks 140 fixed to opposite sides of the wall of cylinder 42. A retainer cap 142 is pivotally mounted on each block 140 to selectively hold the shaft 138 in place and to allow its removal from the apparatus. A split coupling 144 has a portion fixed to one end of the shaft 138 and another portion to a drive shaft 146 of a variable speed motor $M^3$.

It can be seen that by pivoting the caps 134 and 142, the shaft 138, cams 136 and a portion of the coupling may be removed from or placed into the apparatus as desired. Also, when the motor $M^3$ is operated the cams 136 synchronously rotate and reciprocate the horizontal comb 90 and elements 96 vertically. The slots, see FIG. 1, in the sleeve 94 allow the comb 90 to move vertically sufficiently and clear the bar 74. The slots 44a in the cylinder wall are extended axially a short distance into and vertically to the top of each block 140 to guide the comb 90 during its vertical movement therein and about the arbor 26.

The horizontal comb is reciprocated and used serially against the elongated grains in conjunction with the comb 70 that is held stationary during rotation of the mixture. Elongated particles are thus circumferentially oriented by the comb 70 and are then oriented to the position shown in FIGS. 11 and 12 to lie parallel to the axis of rotation of the finished wheel by either combs 96 or 122.

The particle contacting or combing elements of the combs are made as thin as possible and preferably of 1/16" diameter stiff wire material such as wear resistant stainless steel or tungsten carbide rod.

Any of the well known abrasive mixtures including vitrifiable, or oganic bonding material and fillers may be used with my invention and elongated particles can be added thereto and positioned within the mix as here taught.

The reinforcing fibers $f$ may be made of various well known organic or inorganic materials. I have found that steel fibers are best suited for this purpose and have great strength compared to other materials. But elongated glass fiber materials either individual fibers or preferably bundles of such fibrous material are also serviceable for this purpose. I suggest that certain fibers may be used in resin bond mixes by prestiffening them by partially impregnating the fibers with a resin and hardening the resin in the fibers prior to incorporation in the mix.

Suitable elongated abrasive grains of any of the well-known metal oxides, carbides, and diamonds may be used. In such a case they may be prepared and graded in any of the various well-known methods.

After the mixture in the mold has been combed and the elongated particles oriented in the desired direction, the combs and cylinder 42 and if used cylinder 40a, are removed from the mixture and mold cavity. Obviously, a very small insignificant number of oriented elongated particles may be disturbed upon removal of the grids but this will not appreciably affect the grinding efficiency of the ultimately formed wheel.

Thereafter, the mixture A and mold 20 and base plate 18 and arbor 26 are transferred together to a suitable pressing apparatus; a top mold plate similar to the bottom mold plate 22 is placed on top of the mixture and pressure is applied thereto to press the mixture to the required density and shape. The pressed mix is then cured and removed from the mold in any well-known manner.

Circumferential orientation used herein is hereby defined as orienting the elongated particles in any area extending to the central axis, so the long axes of the elongated particles extending in a circular pattern around the axis of the wheel and the axes remain substantially parallel to the side faces of the wheel.

Radial orientation is intended to describe the orientation of elongated particles so that their long axes extend in a radial direction with respect to the axis of rotation of the finished wheel and thus are disposed to be substantially perpendicular to the peripheral working surface thereof.

Although the preferred embodiment shown herein discloses rotating the mold and moving the mixture past the relatively stationary combing elements, it is possible to modify the apparatus to make it operative to rotate or move the combing elements relative to the mixture within a stationary mold. Also, as will now be evident, the mold need not be circular and hence, bonded abrasive tools of other non-circular shapes with oriented particles can be produced by causing relative movement between the mixture and the combing elements in the proper direction.

Many possible modifications may occur to those skilled in the art which will fall within the scope of the following claims.

What is claimed is:

1. Apparatus for orienting elongated particles within a bondable mixture situated in a cavity within a mold during relative movement between the mixture and the apparatus comprising:
   support means for supporting the apparatus;
   a mold having a cavity for containing the bondable mixture supported by the support means in substantially a horizontal position;
   horizontal combing means in the mold cavity, for contacting and orienting the elongated particles with their long axes in substantially horizontal parallel planes during the relative movement; and
   vertical combing means in the mixture, spaced from the horizontal combing means, for contacting and orienting the elongated particles oriented in the horizontal parallel planes so the long axes of substantially all of the elongated particles extend circumferentially within the mold, during the relative movement; and
   drive means for causing relative rotational movement between the mold including the mixture and the combing means.

2. The apparatus of claim 1 further comprising:
   means for reciprocating the vertical combing means horizontally, whereby the elongated particles are oriented with their long axes extending substantially radially as a result of the relative movement between the vertical combing means and the mixture.

3. Apparatus for orienting elongated particles in a bondable abrasive mixture within a mold cavity during relative movement between the mixture and the apparatus so their long axes extend substantially perpendicular to a working face of an abrasive tool produced upon forming and bonding the mixture, comprising:
   a mold, having a cavity for containing the bondable abrasive mixture, supported in a horizontal position;
   support means about the mold and extending vertically into the cavity, for supporting the apparatus for engagement with the mixture;
   a plurality of rows of thin parallel horizontal combing elements, in the mold cavity, fixed at opposite ends to the support means extending into the mold cavity, the horizontal combing elements in each row being uniformly spaced vertically and spaced horizontally from the elements of adjacent rows a distance greater than the length of the elongated particles and the elements of adjacent rows being staggered and spaced vertically an amount greater than the thickness of the elongated particles, whereby the rows of staggered horizontal combing elements will collectively inscribe equally spaced parallel paths, contact, and orient the elongated particles with their long axes extending in substantially horizontal parallel planes in the mixture between the paths, during the relative movement between the mixture and the horizontal combing elements;
   a support bar reciprocable above and horizontally across the mold cavity during the relative movement;
   means for reciprocating the support bar;
   at least one horizontal row of thin parallel vertical combing elements fixed to the bar and extending vertically into the cavity and mixture,
   the vertical combing elements in each row being uniformly spaced horizontally a distance greater than the length of the elongated particles and spaced horizontally from the elements of any adjacent row an amount greater than the thickness of the elongated particles, whereby reciprocation of the vertical combing elements during relative movement, the elements will contact and orient the elongated particles in the substantially horizontal parallel planes, with their long axes extending substantially radially; and
   drive means for causing relative rotational movement between the mold including the mixture and the combing elements.

4. Apparatus according to claim 3 wherein the support means comprises:
   a cylinder, insertable within the mold cavity having a central axis and to which one end of the horizontal combing elements are fixed; and
   a sleeve within the cylinder adapted to be disposed about the central axis, and to which the opposite ends of the horizontal combing elements are fixed.

5. Apparatus for orienting elongated particles within a bondable abrasive mixture so their axes will be substantially parallel and extend substantially perpendicular to or selectively circumferentially of a working face of a bonded abrasive tool produced upon forming and curing the mixture, comprising:
   a base;
   means on the base for supporting a mold in a horizontal plane above the base;
   a mold on the mold supporting means, the mold having a central axis, a vertical sidewall with a top side around the central axis, and a bottom mold plate forming a mold cavity into which a layer of the mixture is placed;
   horizontal combining means, in the mold cavity, for contacting and orienting the elongated particles in the mixture with their long axes in substantially horizontal parallel planes;
   vertical combing means, spaced from the horizontal combing means in the mold cavity, for contacting and orienting the elongated particles oriented in the horizontal parallel planes within the mixture with their long axes extending substantially perpendicular to or selectively circumferentially of the working face of the tool;
   means, adjacent the mold, for supporting the combing means independently of the mold;
   means for selectively reciprocating or maintaining the vertical combing means stationary, whereby the elongated particles are respectively oriented selectively perpendicular to or circumferentially of the working face; and
   drive means on the base for causing relative rotational movement between the combing means and the mold whereby the mixture and substantially all of the elongated particles therein are engaged and oriented by the combining means.

6. Apparatus according to claim 5 wherein the horizontal combing means comprises:
   a plurality of staggered thin parallel combing elements extending horizontally in the cavity between the sidewall and the central axis of the mold and are spaced uniformly apart in a vertical direction a distance greater than the thickness of the elongated particles.

7. Apparatus according to claim 6 wherein the vertical combing means comrises:
a plurality of staggered thin parallel combing elements extending vertically into the cavity substantially to the bottom mold plate and are spaced uniformly apart in a horizontal direction, a distance greater than the thickness of the elongated particles.

8. Apparatus according to claim 5 which further comprises:
means included in the drive means for rotating the mold about a vertical axis and means for reciprocating the horizontal combing means vertically in the mixture whereby the circumferentailly oriented elongated particles are oriented with their long axes extending substantially parallel to the axis about which the mold rotates.

9. Apparatus according to claim 8 which further comprises:
an inner combing means, interchangeable with the vertical combing means, and adapted to be centrally disposed in the mold cavity after the vertical and horizontal combing means have been removed from the cavity, the inner combing means separating the cavity and the mixture therein into inner and outer annular portions and having vertically extending elements for orienting the long axes of the elongated particles in the inner annular portion circumferentially during relative movement between the mixture and the vertical elements.

10. Apparatus according to claim 8 which further comprises vertical reciprocable combing means, traversable through the mixture after the horizontal and vertical combing means have been removed from the mold cavity, for orienting the long axes of the elongated particles in the mixture substantially parallel to the central axis about which the mold rotates.

11. Apparatus according to claim 10 wherein the vertical reciprocable combing means comprises:
a support bar extending horizontally above the mold cavity and supported by the combing means support means;
a motor slidably mounted on the support bar above the mold cavity and mixture therein;
a tool holder extending vertically from and being reciprocably driven by the motor;
a vertical bar fixed at one end to the tool holder and extending into the outer annular zone of the cavity and mixture;
a plurality of short horizontally disposed combing elements, said filaments being arranged in vertically spaced rows fixed to opposite sides of the vertical bar;
the short horizontal combing elements in each row being uniformly spaced apart vertically and spaced from the elements of the adjacent row a distance greater than the length of the elongated particles;
the short horizontal combing elements of the adjacent rows being staggered relative to each other,
whereby the elongated particles in the mixture, after first being oriented circumferentially by utilizing both the horizontal and vertical combing means fixed against movement, may be reoriented with their long axes substantially parallel to the axis about which the mold rotates.

References Cited

UNITED STATES PATENTS

| | | | |
|---|---|---|---|
| 2,902,720 | 9/1959 | Lachiche et al. | 264—108UX |
| 3,115,431 | 12/1963 | Stokes et al. | 264—108X |
| 3,256,560 | 6/1966 | Adomaitis | 264—108X |
| 3,359,350 | 12/1967 | Godfrey | 264—108X |
| 3,468,997 | 9/1969 | Pickels | 264—108 |

J. SPENCER OVERHOLSER, Primary Examiner

M. O. SUTTON, Assistant Examiner

U.S. Cl. X.R.

264—108